United States Patent [19]

Ortiz, Jr. et al.

[11] Patent Number: 5,045,669
[45] Date of Patent: Sep. 3, 1991

[54] METHOD AND APPARATUS FOR OPTICALLY/ACOUSTICALLY MONITORING LASER MATERIALS PROCESSING

[75] Inventors: Angel L. Ortiz, Jr., Scotia; John L. Schneiter, Latham, both of N.Y.

[73] Assignee: General Electric Company, Schenectady, N.Y.

[21] Appl. No.: 487,092

[22] Filed: Mar. 2, 1990

[51] Int. Cl.$^5$ .............................................. B23K 26/02
[52] U.S. Cl. ........................... 219/121.83; 219/121.61; 219/121.62
[58] Field of Search ...................... 219/121.61, 121.62, 219/121.63, 121.64, 121.7, 121.71, 121.83, 121.84, 121.85

[56] References Cited

U.S. PATENT DOCUMENTS

| | | | |
|---|---|---|---|
| 3,700,850 | 10/1972 | Lumley | 215/121.6 |
| 3,806,829 | 4/1974 | Duston et al. | 331/94.5 |
| 4,164,640 | 8/1979 | Scheffels | 219/121.85 |
| 4,311,142 | 1/1982 | Machida | 128/303.1 |
| 4,338,508 | 7/1982 | Jones et al. | 219/121.69 |
| 4,423,726 | 1/1984 | Imagawa et al. | 128/303.1 |
| 4,504,727 | 3/1985 | Melcher et al. | 219/121.61 |
| 4,565,736 | 1/1986 | Jones et al. | 219/121 L |
| 4,672,215 | 6/1987 | Howard | 250/566 |
| 4,676,586 | 6/1987 | Jones et al. | 350/96.20 |
| 4,681,396 | 7/1987 | Jones | 350/96.18 |
| 4,739,162 | 4/1988 | Ortiz, Jr. et al. | 250/227 |
| 4,764,655 | 8/1988 | Ortiz, Jr. et al. | 219/121.65 X |
| 4,766,285 | 8/1988 | Decailloz et al. | 219/121.83 X |
| 4,772,772 | 9/1988 | Juptner et al. | 219/121.83 |
| 4,799,755 | 1/1989 | Jones | 350/96.18 |
| 4,838,631 | 6/1989 | Chande et al. | 350/6.6 |
| 4,960,970 | 10/1990 | Schneiter | 219/121.6 |

FOREIGN PATENT DOCUMENTS

| | | | |
|---|---|---|---|
| 62-142091 | 6/1987 | Japan | 26/00 |
| 63-207487 | 8/1988 | Japan | 26/131 |

Primary Examiner—C. L. Albritton
Attorney, Agent, or Firm—Paul R. Webb; James C. Davis, Jr.

[57] ABSTRACT

A laser materials processing apparatus including means for optically and acoustically monitoring the processing and generating a processing signal representative of the processing, means for interpreting the processing signal and generating an interpreted output, and means for controlling the materials processing based upon the interpreted output and by generating a control signal applied to a laser materials processing component.

16 Claims, 12 Drawing Sheets

METHOD AND APPARATUS FOR OPTICALLY/ACOUSTICALLY MONITORING LASER MATERIALS PROCESSING

The present invention relates to laser materials processing, and more specifically, to a method and apparatus, utilizing both optical and acoustic sensors, for detecting, monitoring, and controlling, in substantially real-time, laser materials processing operations.

RELATED APPLICATIONS the present application is related to commonly assigned U.S. Pat. No. 4,960,970, entitled "Method and Apparatus for Acoustic Breakthrough Detection", issued Oct. 2, 1990 and commonly assigned U.S. patent application Ser. No. 07/489,306, entitled "Method and Apparatus for Optically Monitoring Laser Materials Processing", filed Mar. 5, 1990.

BACKGROUND OF THE INVENTION

Laser materials processing as known in the art and used herein refers to performance of materials processes, such as cutting, welding, drilling and soldering, using a continuous wave or pulsed laser beam. The average power of such a laser beam may range from as little as approximately one watt to 100's of watts, the specific power being selected on the basis of the particular process being performed. Laser beam power required for materials processing generally is much greater than laser beam power required for other laser-based systems such as communication systems.

At an early stage of laser technology advancements, a laser beam emitted directly from a laser source was utilized for laser materials processing. The mobility of such laser systems was limited and it was difficult to effectively incorporate such systems into a manufacturing environment. The laser source and optical components had to be located close to process points on a workpiece.

Transmission of laser beams through optical fibers, at power levels suitable for performing materials processing, greatly enhanced the flexibility of laser-based materials processing systems. The transmission of high power beams through an optical fiber, however, presented difficulties not encountered in low power optical fiber transmission. For example, beam injection techniques utilized for injecting low power beams, such as beams used in communication systems, into an optical fiber generally are not suitable for high power beam injection. In fact, utilizing a low power beam injection technique for injecting a high power beam may result in damaging the optical fiber. Various techniques for the efficient injection of a high power laser beam into an optical fiber for transmission therethrough are disclosed, for example, in commonly assigned U.S. Pat. Nos. 4,564,736; 4,676,586; and 4,681,396 respectively entitled "Industrial Hand Held Laser Tool and Laser System", "Apparatus and Method for Performing Laser Material Processing Through a Fiber Optic", and "High Power Laser Energy Delivery System".

High power beam transmission through optical fibers has obviated a need for positioning, close to a workpiece, a laser source and optical components otherwise required for directing a laser beam emitted from the source to process points on the workpiece. With optical fiber high power laser beam transmission, an output end of each optical fiber is disposed in an output coupling device which includes means to collimate and focus the beam emitted from the fiber output end. The output coupling device is easily moved relative to a workpiece by, for example, a computer-controlled robotic arm. The number of fibers and their respective output ends proximate process points on a workpiece may vary.

Monitoring materials processing when utilizing optical fiber based systems is much more difficult than monitoring processing when a beam emitted from the laser source is directly utilized for processing. Specifically, with optical fiber transmission, a system user must monitor, during the processing and in addition to the laser source, a beam injection system, an output coupler, and an optical fiber. Failure of any one component may result in failure of the entire system.

Also available to enhance laser materials processing are systems for time sharing of a materials processing laser beam among a plurality of optical fibers. Such systems are described in commonly assigned U.S. Pat. Nos. 4,739,162 and 4,838,631 entitled "Laser Beam Injecting System" and "Laser Beam Directing System", respectively. Manufacturers of beam time sharing systems include Robolase Systems, Inc. of Costa Mesa, Calif. and Lumonics Corporation of Livonia, Mich. By the use of such beam time sharing systems, a beam generated by one laser source can be shared among multiple optical fibers. The respective output ends of each optical fiber may be positioned proximate respective process points on one or more workpieces.

Laser beam time sharing systems, sometimes referred to as multiplexers, have further increased the flexibility and efficiency of laser materials processing. The control and monitoring of such multiplexer-based systems not only has increased importance but also has increased difficulty. The system user must monitor a laser source, a multiplexer, multiple beam injecting systems, multiple couplers, and multiple optical fibers.

As laser materials processing has progressed from using, directly, a beam emitted from a source to using multiple beams emitted from multiple fibers, more sophisticated control and monitoring of the processes have become needed. The control and monitoring systems preferably facilitate obtaining desired processing results and aid in preventing damage to the processing equipment. The control and monitoring systems, however, should not slow down the laser materials processing operations. Otherwise, advantages of utilizing optical fiber/laser technology, such as a reduction in processing time, may be lost.

Further, it is preferred that control and monitoring systems operate in substantially real-time. As used herein, the term "real-time" means the actual time which each discrete process operation is performed. For example, a discrete process operation may be drilling one hole. It is most desirable that a control and monitoring system be able to obtain data simultaneous with and during each discrete operation so that if adjustments to processing equipment are needed, such adjustments can be made before a next hole is drilled, i.e., before a next process operation. It should be understood that the time required to perform a discrete process operation may be short, shuch as a few microseconds. The control and monitoring system, therefore, must perform its functions very quickly.

An entire process operation, oof course, generally includes many discrete process operations. Consider, for example, laser drilling of an aircraft engine combustor and afterburner parts. These parts are made from high temperature steel alloys and require tens of thousands of 0.020 inch (0.0508 cm) holes drilled at 20 degrees to the surface, where wall thickness may vary from 0.020 inch (0.0508 cm) to 0.080 inch (0.2032 cm). In order to timely complete the entire process operation, monitoring and controlling the formation of each hole should be performed quickly.

A known method for monitoring laser drilling operations is referred to as air flow testing. For an airflow test, a workpiece such as an aircraft engine combustor part is removed from the drilling apparatus and a known pressure differential is applied across the workpiece. The resulting air flow is measured to provide a measure of flow resistance. Flow resistance is related to a measure of drilled area, i.e., the diameter and shape of the drilled holes. Air flow testing, however, is not a real-time operation in the sense that laser processing cannot take place on a workpiece during an air flow test. An air flow test limitation is that it also is not an indicator of other hole geometric properties, e.g. recast layer thickness, hole taper, etc.

Another known method for checking the results of a laser drilling operation is "pin checking". In a pin checking operation, drilling is stopped, and then pins of successively increasing diameter are successively inserted into selected holes. Pin checking provides an approximate indication of hole diameter because laser-drilled holes are rarely perfectly straight, thus blocking insertion of the pins. Pin checking also is not a reliable indicator of other hole geometric properties nor is it a real time process. Further, only selected holes are analyzed in the pin checking procedure and differences between each hole may not be detected.

It is therefore an object of the present invention to provide a method and system for detecting and monitoring, in substantially real time, laser materials processing.

Another object of the present invention is to provide a method and system for detecting and monitoring laser materials processing which do not slow down the processing operations.

Still another object of the present invention is to provide a method and system for detecting and monitoring laser materials processing which allow continuous monitoring of the processing operations and provide an indication of geometric properties including recast layer thickness and hole taper.

Still yet another object of the present invention is to provide a method and system for detecting and monitoring laser materials processing which operate simultaneously with the processing operations.

Another object of the present invention is to provide a method and system which utilize optical and acoustic sensors to monitor plasma generated during a laser. materials processing operation, and from data provided by the sensors, control the processing operations.

Still another object of the present invention is to provide a control system which facilitates obtaining consistent laser materials processing performance.

Still yet another object of the present invention is to provide a method and system for monitoring and controlling performance of laser materials processing components.

SUMMARY OF THE INVENTION

The present system for monitoring and controlling laser materials processing includes means for detecting acoustic/optic signals during the processing operations and means for determining laser beam breakthrough time. A method in accordance with the invention for laser processing a workpiece includes the steps of acoustically/optically monitoring the workpiece and determining laser beam breakthrough time. By determining breakthrough time in substantially real time, the present invention provides timely information for controlling materials processing operations.

Laser beam breakthrough time, as used herein, refers to the fractional time breakthrough is detected compared with total laser pulse duration. It is recognized that laser pulse length, rather than laser pulse duration, could be utilized to calculate breakthrough time. Laser pulse duration equals the total time period that a beam pulse is applied to a workpiece whereas laser fulse length, as used in the art and as used herein, means the time period between one-half maximum beam intensity values of the beam pulse. Either pulse duration or pulse length may be utilized so long as such usage is consistent.

By acoustically and optically monitoring. continuously, a laser-based materials processing operation, and from acoustic and optic signals, the precise time at which a beam breaks through the material can be detected. By comparing the time period required to break through the material with the laser pulse duration, information regarding the hole drilled as result of the operation can be determined.

For example, if breakthrough is detected just at the end of the beam pulse duration, then breakthrough time may be substantially equal to one (1). This means that the laser beam was not applied for very long after breaking through the workpiece. This, in turn, means that a smaller diameter hole was formed. Conversely, if breakthrought is detected at the beginning of the beam pulse duration, then breakthrough time may, for example, be equal to 0.2, i.e., smaller than if breakthrough is detected near the end of the beam duration. This means that the laser beam was applied for a relatively long time, e.g., 0.8, subsequent to breakthrough. This, in turn, means that a larger diameter hole is formed. It should be understood of course that the above examples are for illustrative purposes only.

The present invention provides continuous monitoring and control of laser materials processing and operates in substantially real time. Importantly, the present invention does not affect laser materials processing speed and operates simultaneously with the processing operations. The present invention may be utilized to provide an indication of other hole geometry properties including recast layer thickness and hole taper. Further, the present invention facilitates obtaining consistent and high quality results from laser materials processing.

BRIEF DESCRIPTION OF THE DRAWINGS

These and other objects of the present invention, together with further features and advantages thereof, will be apparent from the following detailed specification when read together with the accompanying drawings, in which.

DETAILED DESCRIPTION OF THE DRAWINGS

Figure 1:
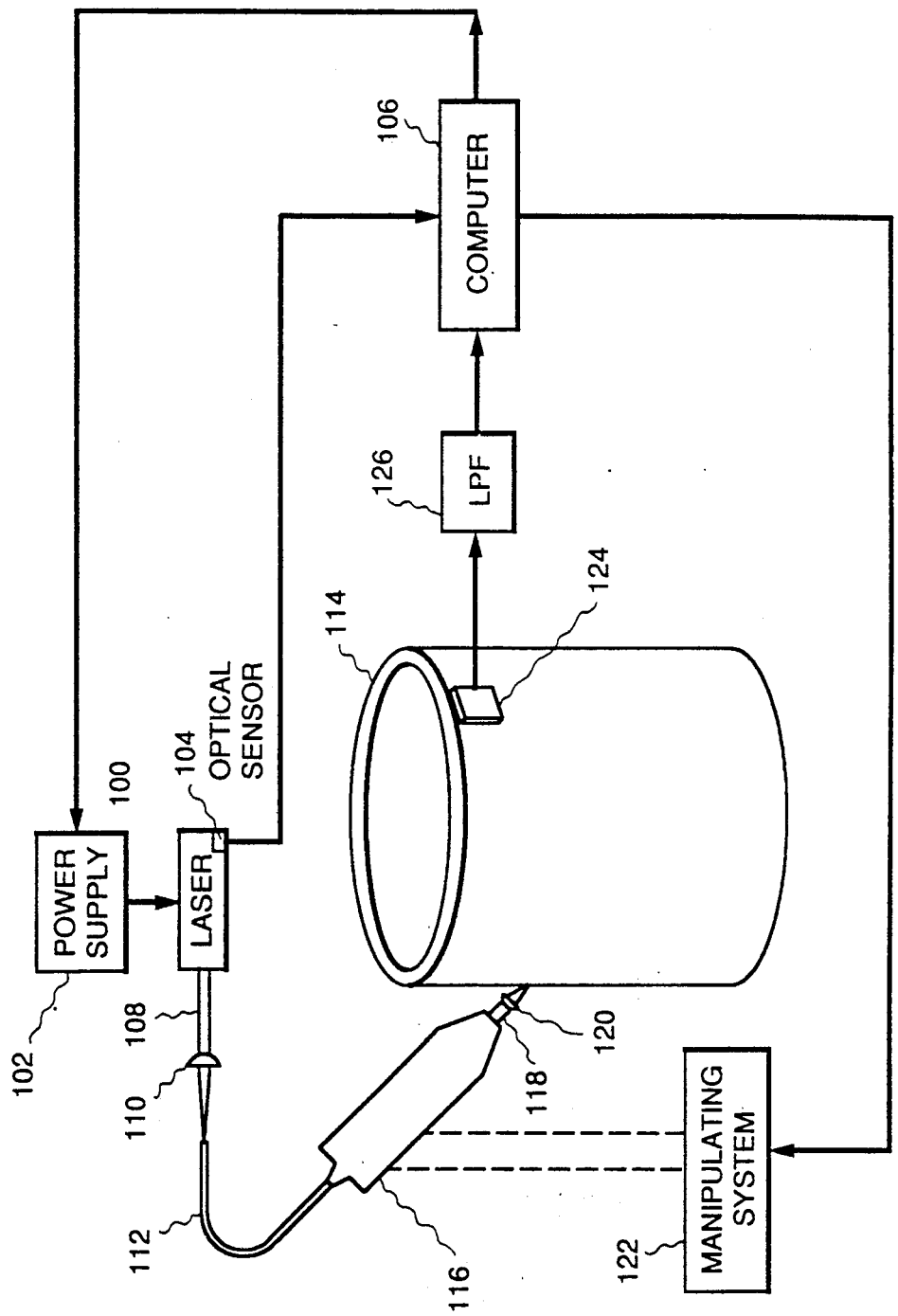
FIG. 1 shows a partly isometric and partly block diagram of a first embodiment of an acoustic-based monitoring apparatus.

FIG. 1 shows a laser 100, such as a face pumped laser (FPL) of the Nd:YAG type. While other types of lasers can be used, FPLs are preferred since they have a high energy density, a large depth of field that does not require refocusing between pulses, and a high beam quality. Furthermore, Nd:YAG provides an output at 1.06 micrometer, which is a good wavelength for processing a large number of materials. Laser 100 includes excitation means, such as flash tubes (not shown), powered and controlled by a power supply 102. Laser 100 also includes an optical sensor 104, such as a photo diode, disposed on the outside of a totally reflecting cavity mirror to monitor light leakage since such a mirror is not in fact "totally" reflecting. An output signal from sensor 104 is applied to a computer 106. An output light beam 108 from laser 100 is focussed by a plano-convex lens 110 into an optical fiber 112. Preferably, both ends of fiber 112 are prepared such as shown in U.S. Pat. Nos. 4,676,586 and 4,681,396 so that the fiber is not damaged by the injection or emitted laser light. If desired, a light multiplexer, such as shown in U.S. Pat. No. 4,739,162, can be used to allow simultaneous processing at a plurality of workpiece locations.

An output end of fiber 112 is preferably held near a workpiece 114 by an output coupler 116 such as shown in U.S. Pat. No. 4,799,755. A beam 118 emitted from coupler 116 is focussed upon workpiece 114 by a plano-convex lens 120. If desired, lens 120 can be incorporated in coupler 116, or it can be eliminated depending upon the desired drilled hole diameter. Also if desired, coupler 116 can be eliminated altogether. Further, if desired, laser 100 can be positioned proximate workpiece 114 with beam 108 directly incident on workpiece 114, i.e., without lenses 110 and 120, fiber 112 and coupler 116. Coupler 116 is supported by a manipulation system 122 such as model HP-105 machine tool made by S.E. Huffman Corp., Clover, S.C. If desired, coupler 116 can be positioned at a fixed location and workpiece 114 mounted on a controllable positioner. In either embodiment, the relative position of workpiece 114 with respect to coupler 116 is controllable.

When oonly acoustic monitoring is utilized, workpiece 114 can be a metal, e.g., steel, or aluminum, a plastic, or in general any reasonably solid material capable of transmitting laser drilling-induced vibrations when impulse excited. As explained in more detail hereinafter, when using optical monitoring, there is no such limitation on workpiece material. Workpiece 114 can be either stationary or moving, e.g., rotating. Although shown as a hollow circular cylinder, workpiece 114 can have many other shapes.

In the acoustic monitoring embodiment, an acoustical sensor 124, such as an accelerometer, contact or non-contact microphone, or acoustic emission sensor or any means suitable for detecting acoustic vibrations, is mounted on workpiece 114, or if desired, on a baseplate (not shown) that supports workpiece 114. Alternatively, a microphone can be disposed near workpiece 114, but this can result in undesirable ambient noise pickup. The signal from sensor 124 is applied to an anti-aliasing low pass filter (LPF) 126 with a cut off frequency of about 150 kHz although other frequencies can be used. If workpiece 124 is rotating, slip rings (not shown) or telemetry can be used to apply the signal from acoustic sensor 124 to LPF 126. The output signal from LPF 126 is applied to a computer 106. Output signals from computer 106 are applied to power supply 102 and also to manipulating system 122.

Figure 2A:
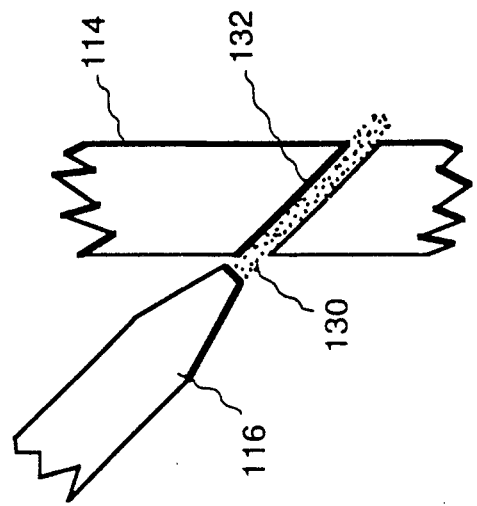
FIGS. 2A-B, respectively, show a laser beam incident on a workpiece during drilling and breakthrough, respectively.
Figure 3:
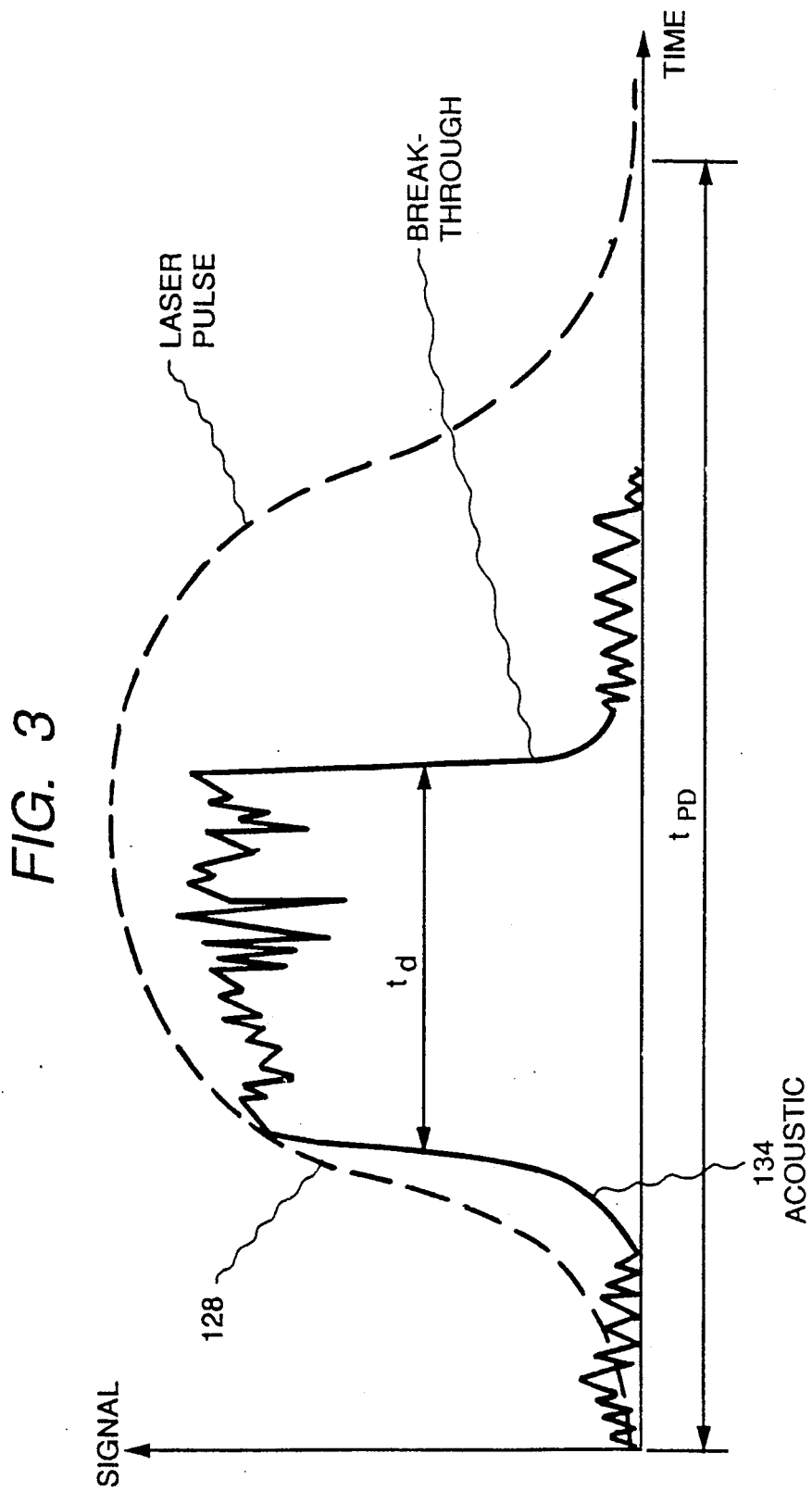
FIG. 3 shows signals generated during the drilling and at breakthrough by the apparatus illustrated in FIG. 1.

In operation, and as shown in FIG. 3, a light pulse 128 emitted by laser 100 is sensed by sensor 104 and applied to computer 106. Pulse 128 is also emitted from coupler 116 and, as shown in FIG. 2A, heats the material of workpiece 114 causing it to vaporize, and thus ejection of a high speed turbulent plasma 130 of the material and the drilling of a hole 132. Vibrations are set up in the parent (undrilled) material workpiece 114 as a result of plasma 130 and molten material (not shown) ejection.

The characteristics of hole 132, e.g., diameter, recast layer thickness, etc., depend upon the energy in pulse 128. In particular, if the pulse is present after breaking through workpiece 114, the hole diameter will be enlarged. These characteristics also depend upon the position of the focal plane of the laser beam on workpiece 114, if lens 120 is present either in coupler 116 or externally thereto. In particular, if the focal plane is on the surface of workpiece 114, a larger diameter hole is drilled than if the focal plane is below the surface.

Figure 2B:
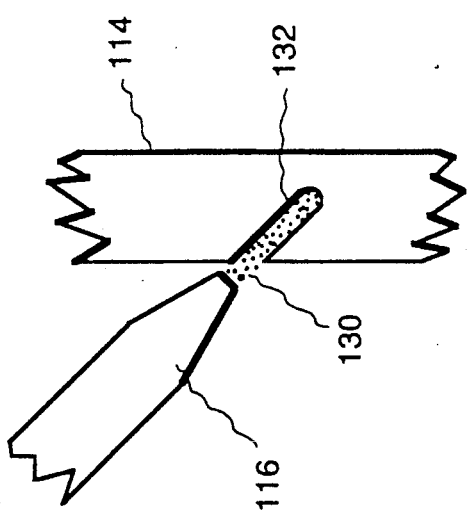

The turbulent flow causes vibrations in workpiece 114 due to its generally low damping. These vibrations are received by sensor 124 as a signal 134, as shown in FIG. 3, essentially instantaneously due to the generally high speed of sound transmitted in workpiece 114. At breakthrough, shown in FIG. 2B, material from workpiece 114 is no longer strongly vaporized. As shown in FIG. 3, the vibrations and signal 134 are greatly and measurably reduced.

Computer 106 comprises an analog-to-digital converter operating at a frequency of 111 KHz to convert the signal from optical sensor 104. Other frequencies can be used. The converted signal is then applied to a decision algorithm, such as a threshold operation, which allows for the detection or determination of the onset and cessation of the laser pulse. The data resulting from this algorithm represents the optical pulse duration $t_{PD}$.

Computer 106 also comprises an analog-to-digital converter for the signal from LPF 126, which operates at a sampling frequency of 333 kHz although other frequencies can be used. In this case, LPF 126 would have a cutoff frequency of not greater than one-half the sampling frequency as in accordance with the Nyquist criterion. Within computer 106 the vibration data from LPF 126 are digitized and then operated upon by a digital filter algorithm that acts as a bandpass filter, which in a particular embodiment has cutoff frequencies between about 40 to 80 kHz. These frequencies are caused by the vibrations due to the turbulent ejected flow. In general, the bandpass of interest will be a function of the workpiece material and thickness, the wavelength of laser light 108, the hole geometry, the rigidity of the fixture holding workpiece 114, etc.

The bandpass-filtered waveform is operated upon by a fast Fourier transform algorithm (FFT) that does a spectral analysis. In a particular embodiment, each laser pulse of about 4 ms produced a total of 1536 samples. The first one hundred twenty eight samples are spectrally analyzed by the FFT algorithm. Then a shift of twenty-one samples is made and a second one hundred twenty eight samples are spectrally analyzed starting from the twenty first sample. The process is repeated until the last sample is reached.

A threshold decision algorithm is applied to the temporal spectral data resulting from the FFT to determine breakthrough. This can be a simple threshold level that is set to some fraction, e.g., one half the maximum expected amplitude of the filtered frequencies, to determine if these frequencies are present or not present at a particular time during drilling. The output data from this threshold decision algorithm is an acoustical signal pulse length $t_d$.

In FIG. 3, acoustic signal 134 and laser light signal 128 are shown. Computer 106 calculates the ratio of $t_d$ to $t_{PD}$, i.e., breakthrough time, which is an indirect measure of hole diameter. This calculated breakthrough time is compared with an expected breakthrough time obtained from previous drilling data that has been previously stored in computer 106.

This information is used to apply a control signal to power supply 102 to control laser pulse energy and, also, a control signal is applied to manipulation system 122 to change the relative distance between workpiece 114 and coupler 116. This changes the focal plane of the light pulse 128 with respect to workpiece 114. Thus, by changing these two variables, an acceptable hole can be drilled during a next laser pulse. In particular, if actual breakthrough time is longer than expected breakthrough time, i.e., too small a hole diameter, laser pulse energy is increased. Similarly, if the breakthrough time is shorter than expected, i.e., too large a hole diameter, laser pulse energy may be decreased. In addition, if the breakthrough time suddenly becomes longer, it could indicate a defect in the optical system, e.g., a defect in fiber 116. Computer 106 can monitor this and supply an alarm signal for the operator.

It will be appreciated that although the above description is directed to drilling, the invention can be used with other laser materials processes, e.g., surface cladding, heat treating, cutting, etc. These other processes also produce ejected material, and therefore vibrations in workpiece 114. Further, computer 106 might be programmed to sense a change in the sonic signature, e.g., frequencies, other than a cessation of vibration at a specific frequency.

Figure 4:
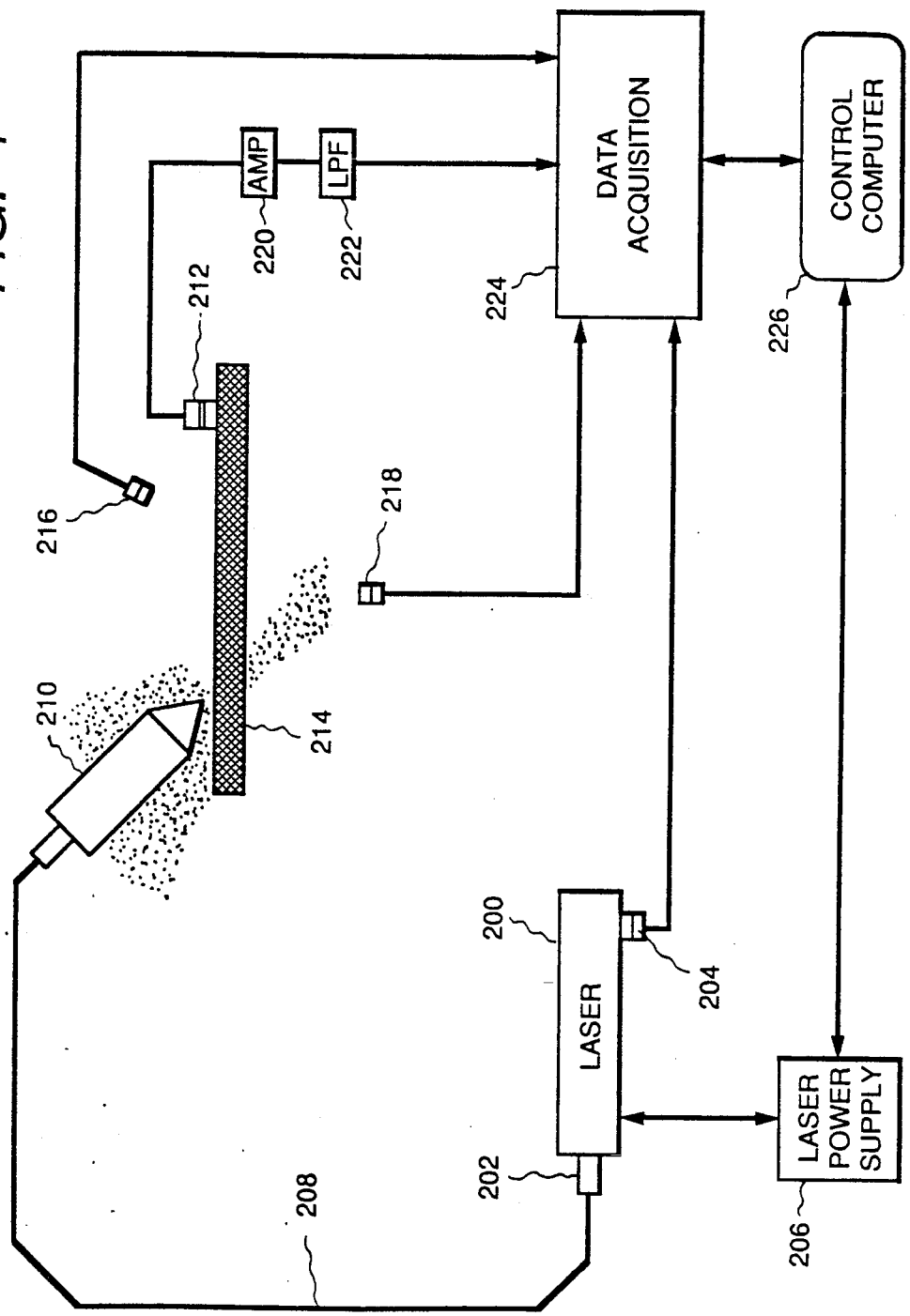
FIG. 4 shows a partly isometric and partly block diagram of a second embodiment of an optic/acoustic-based monitoring apparatus.

FIG. 4 illustrates a second embodiment of an optic/acoustic based monitoring apparatus in accordance with the present invention. Specifically, and referring to FIG. 4, an optic/acoustic based monitoring system includes a laser source 200 including a fiber injection input coupler 202 and a cavity monitor 204 such as a photodiode. A laser power supply 206 is coupled to the laser and provides power for flashlamps (not shown). The apparatus further includes an optical fiber 208 coupled between laser source 200 and an output coupler 210. An acoustic sensor 212 is mounted to or substantially adjacent a workpiece 214. A top-side optic sensor 216 and a bottom-side optic sensor 218, such as photodiodes, may be mounted to a frame (not shown) and disposed proximate the workpiece. The optic sensors may be photodiodes, photo-transistors, photo-multiplier, or any means suitable for generating an electrical signal representative of detected optic regarding the laser interaction plasma behavior. A signal 232 is the signal which was generated by optic sensor 218 and provides data on actual breakthrough onset time. As is apparent from FIG. 5, breakthrough was detected at approximately 0.002 seconds.

Figure 6A:
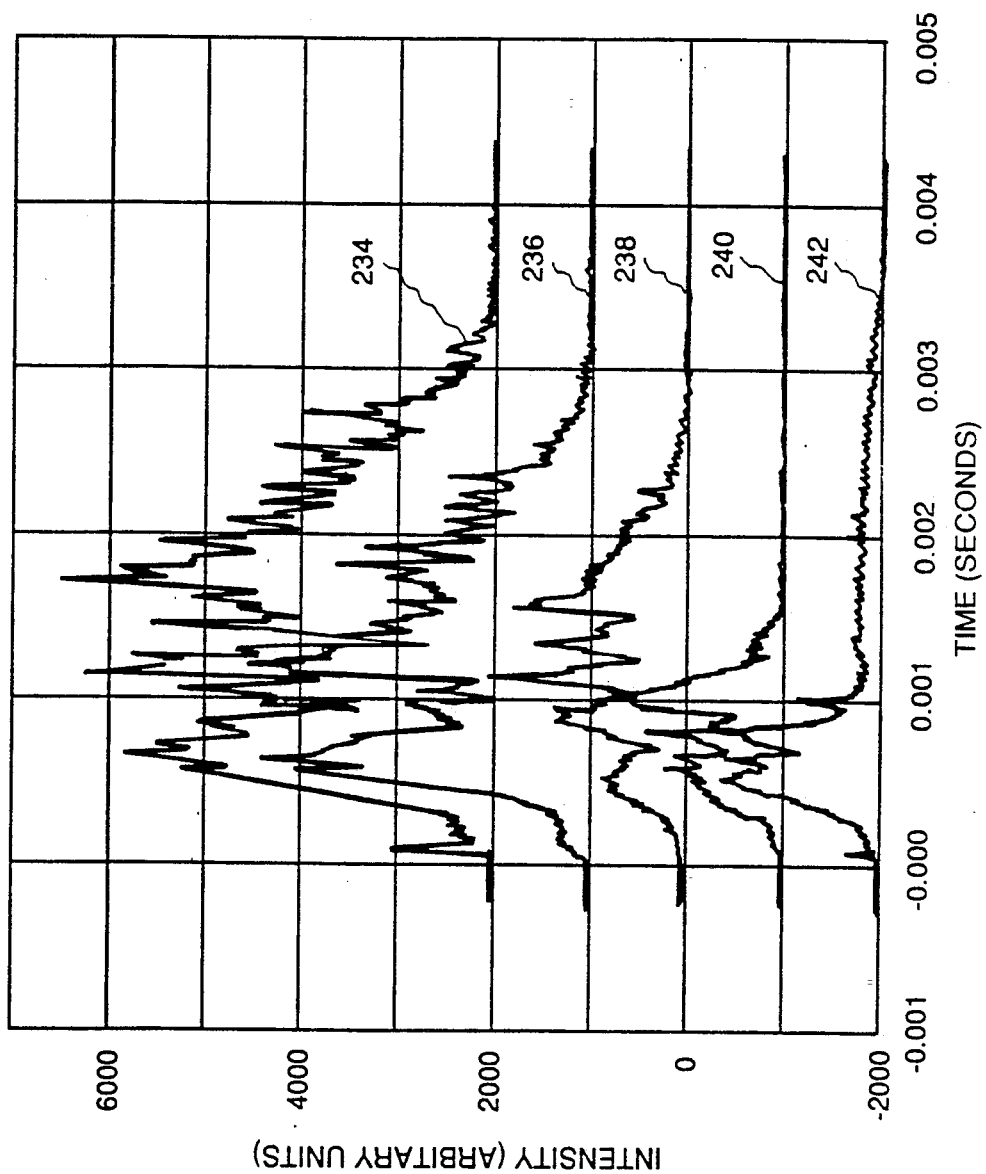
FIGS. 6A-B illustrate signals generated during drilling and at breakthrough for various material thicknesses.

FIG. 6A shows signals generated by the top side sensor for a variety of thickness materials. Specifically, in FIG. 6A, signals 234, 236, 238, 240 and 242 correspond to the signals generated by optical sensor 216 when drilling through materials of 60 mils, 50 mils, 40 mils, 30 mils, and 20 mils, thicknesses, respectively (1 mil=0.001 inches). The data is shown as being vertically displaced for clarity. Signals 244, 246, 248, 250, and 252 in FIG. 6B correspond to signals which were generated by optical sensor 218 when drilling through materials having a thickness of 60 mils, 50 mils, 40 mils, 30 mils, and 20 mils, respectively. Again, the signals are shown as being vertically displaced for clarity.

Figure 5:
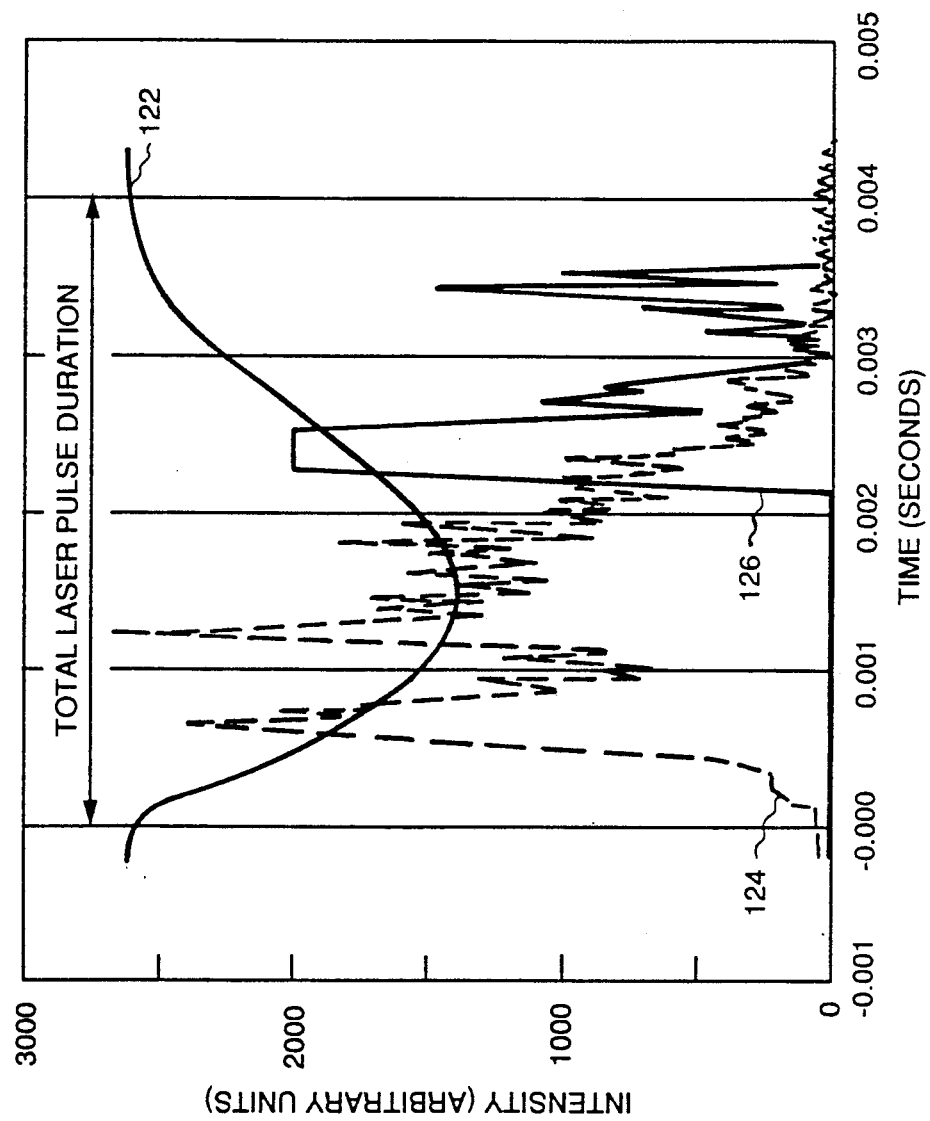
FIG. 5 shows signals generated during drilling and at breakthrough by the apparatus illustrated in FIG. 4.
Figure 6B:
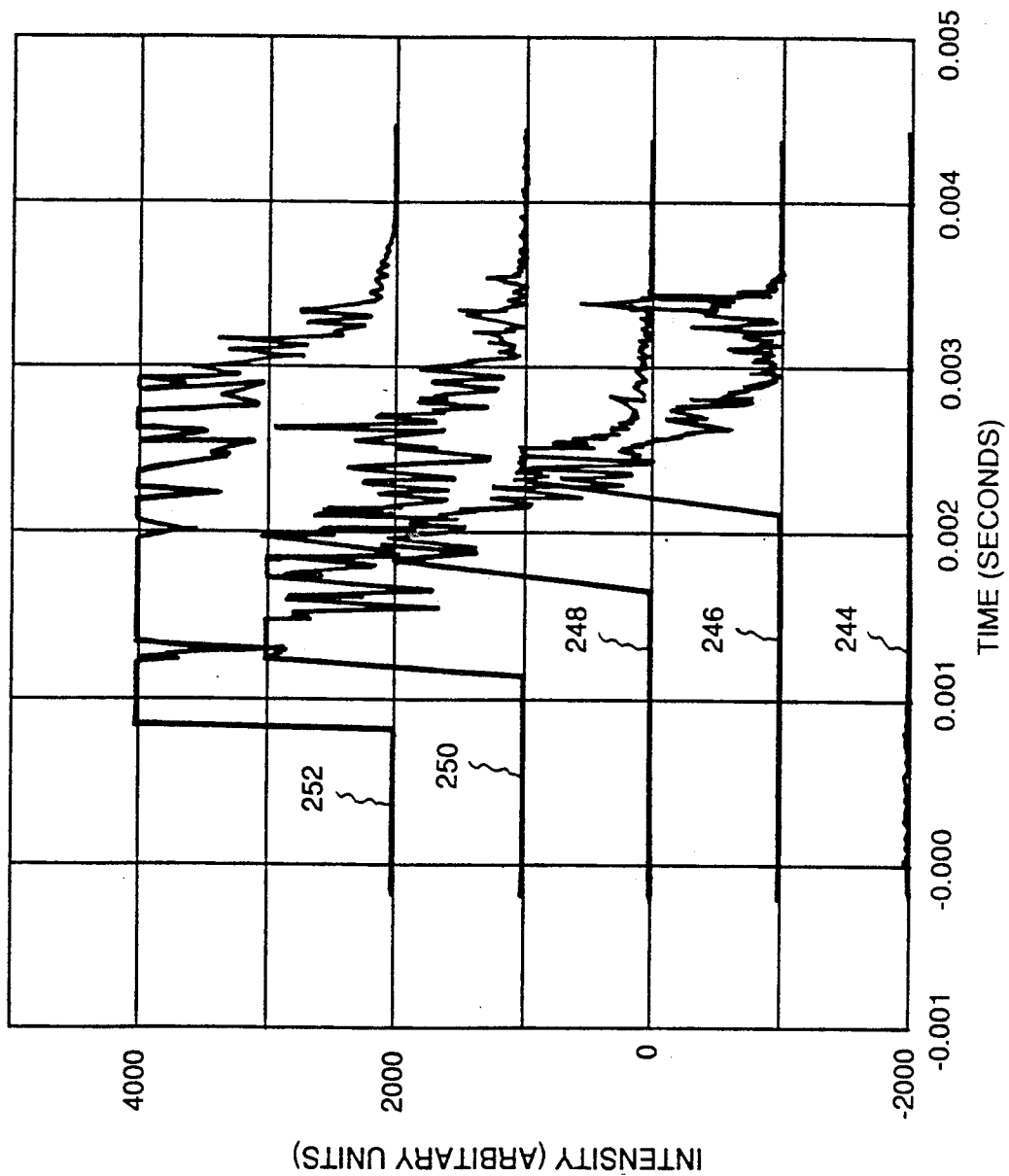

The signals represented in FIGS. 5 and 6A-B were generated during actual processing operations. In FIG. 6A, the data establishes that pulse width of the top side sensor generated signals decreases as breakthrough time decreases. Further, signal 234 corresponds to a 60 mil thickness material wherein no breakthrough occurred. This condition is the no breakthrough baseline. Further, as shown in FIG. 6B, the pulse width of the signal generated by the bottom side sensor increases as breakthrough time decreases. For the 60 mil thick material, no breakthrough was detected as indicated by signal 244. This condition is the no breakthrough baseline.

In some operations, it is contemplated that a bottom side sensor may not be utilized due to work environment constraints. Data from only a top side sensor, therefore, would have to be utilized to monitor and control the operations. More specifically, if only a top side sensor is being utilized, the thickness, e.g., 40 mils, of the workpiece would first be ascertained. A test coupon of the same thickness would then be utilized for gathering characteristics. Acoustic monitor 212 is coupled to an amplifier 220 which in turn is coupled to a low pass filter 222. A data acquisition unit 224 receives inputs from the photodetectors and the acoustic sensor. Data acquisition unit 224 is coupled to a control computer 226.

The second embodiment illustrated in FIG. 4 is substantially similar to the first embodiment illustrated in FIG. 1 except that the second embodiment includes optical sensors. Optical sensors 216 and 218, for example, could be optical sensors commercially available such as model YAG-100A manufactured by EG&G of Salem, MA or a Series AFM Fiberoptic Monitor from Antel Optronics Inc. of Burlington, Ontario-Canada. Data acquisition unit preferably is a high speed data acquisition system capable of capturing data at a rate of 3 microseconds per sample. A data acquisition system may, for example, be a system commercially available such as a Burr Brown Model MPV901 A/D Converter coupled in a Motorola Series 68020 computer.

In operation, the acoustic monitoring system of the second embodiment shown in FIG. 4 operates substantially in accordance with the operation described with reference to the first embodiment illustrated in FIG. 1. Top-side optical sensor 216 is utilized to optically detect a laser interaction plasma region and the bottom side optical sensor is utilized to detect material breakthrough plasma. More specifically, the optical sensor will generate signals related to the intensity of light generated during a materials processing operation.

FIG. 5 illustrates signals generated during a laser drilling operation utilizing the apparatus illustrated in FIG. 4. Specifically, in FIG. 5, the vertical scale represent intensity (arbitrary units) and the horizontal scale represents time. A signal 228 is the signal which was provided by photodiode 204 and represents the total laser pulse duration. A signal 230 is the signal which was generated by optic sensor 216 and provides data calibration data using both top and bottom side sensors. Using the sensors, a breakthrough time for the desired diameter hole can be determined, and also a preferred top side sensor signal can be determined. The preferred top side sensor signal would be the top side sensor signal generated when the preferred hole diameter and breakthrough time were present. The preferred top side sensor signal could then be converted to digital form and stored in computer memory.

During operations, a signal just provided from the top side sensor would be compared with the stored top side sensor signal. Many methods, such as a correlation method, could be utilized when performing the comparison. If deviations beyond some predetermined threshold occur, then adjustment to the processing components may be required.

Further, from the gathered data, breakthrough time can be calculated, as best shown in FIG. 5. Specifically, total pulse duration can be determined as well as the time at which breakthrough occurs. Such data is available from signals generated by photodetector 204 and optical sensor 216 and/or 218. Using this gathered information, and once breakthrough time is determined, control computer 226 may make adjustments to the materials processing operations, as described with reference to FIG. 1, in order to achieve the desired results.

Figure 7:
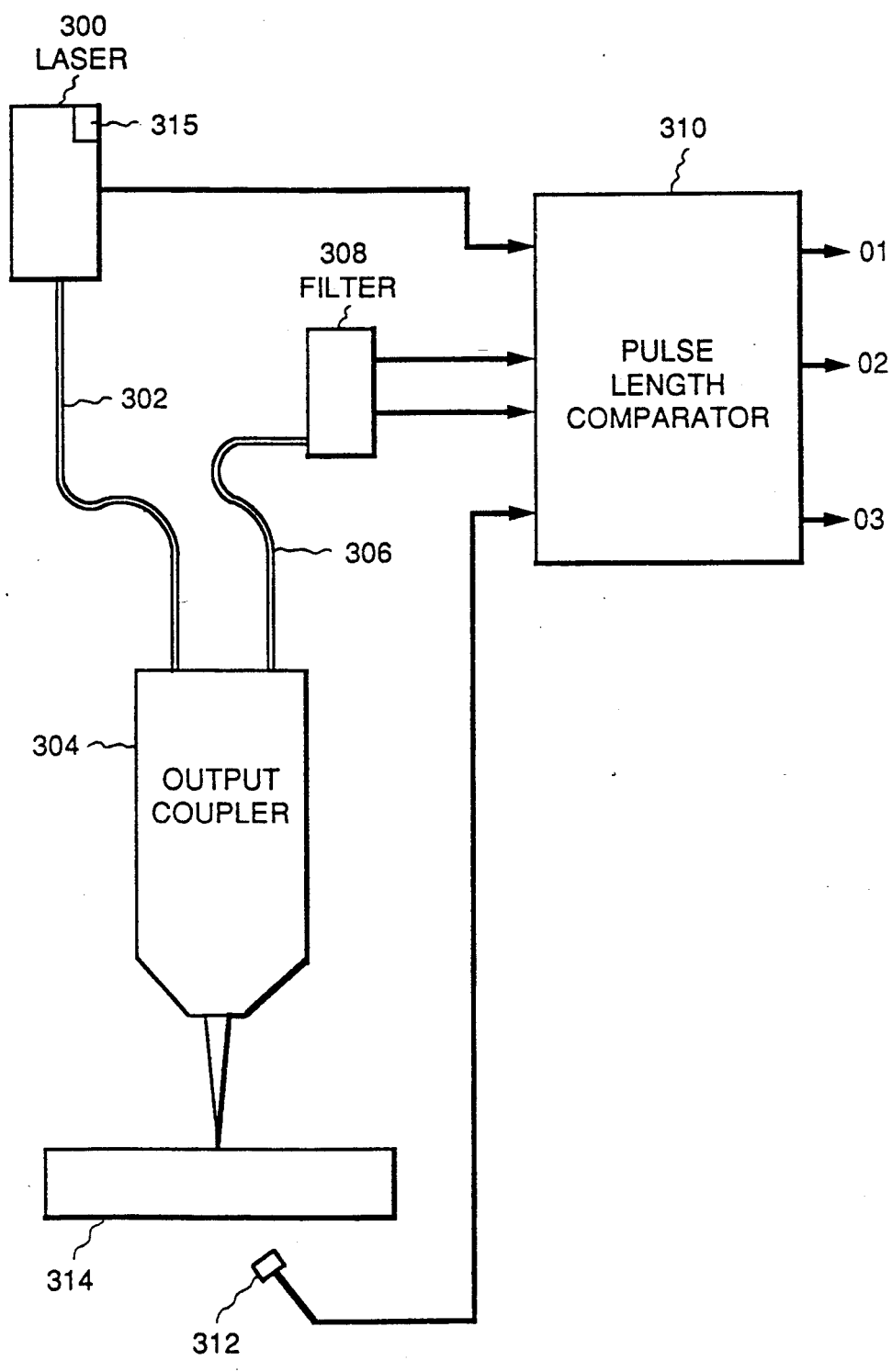
FIG. 7 illustrates a partly isometric and partly block diagram of a third embodiment of an optic-based monitoring apparatus.

FIG. 7 illustrates a third embodiment of an optic based monitoring apparatus. Specifically, FIG. 7 illustrates a laser source 300 and a first optical fiber 302 coupled between laser source 300 and an output coupler 304. A second optical fiber 306 couples output coupler 304 to a filter 308. Laser source 300 and filter 308 are coupled to a pulse length comparator 310. The pulse length comparator may be implemented in software, hardware, or a combination of software and hardware as is known in the art. Another input to pulse length comparator 310 is received from an optical sensor 312 which is disposed below and substantially adjacent a workpiece 314. A photodetector 315 mounted within or to laser source 300 provides another input to pulse length comparator 310. Pulse length comparator 310 generates a first output 01, a second output 02, and a third output 03, respectively, which may be coupled to a laser control, a workpiece manipulator, and a display, respectively.

Figure 8:
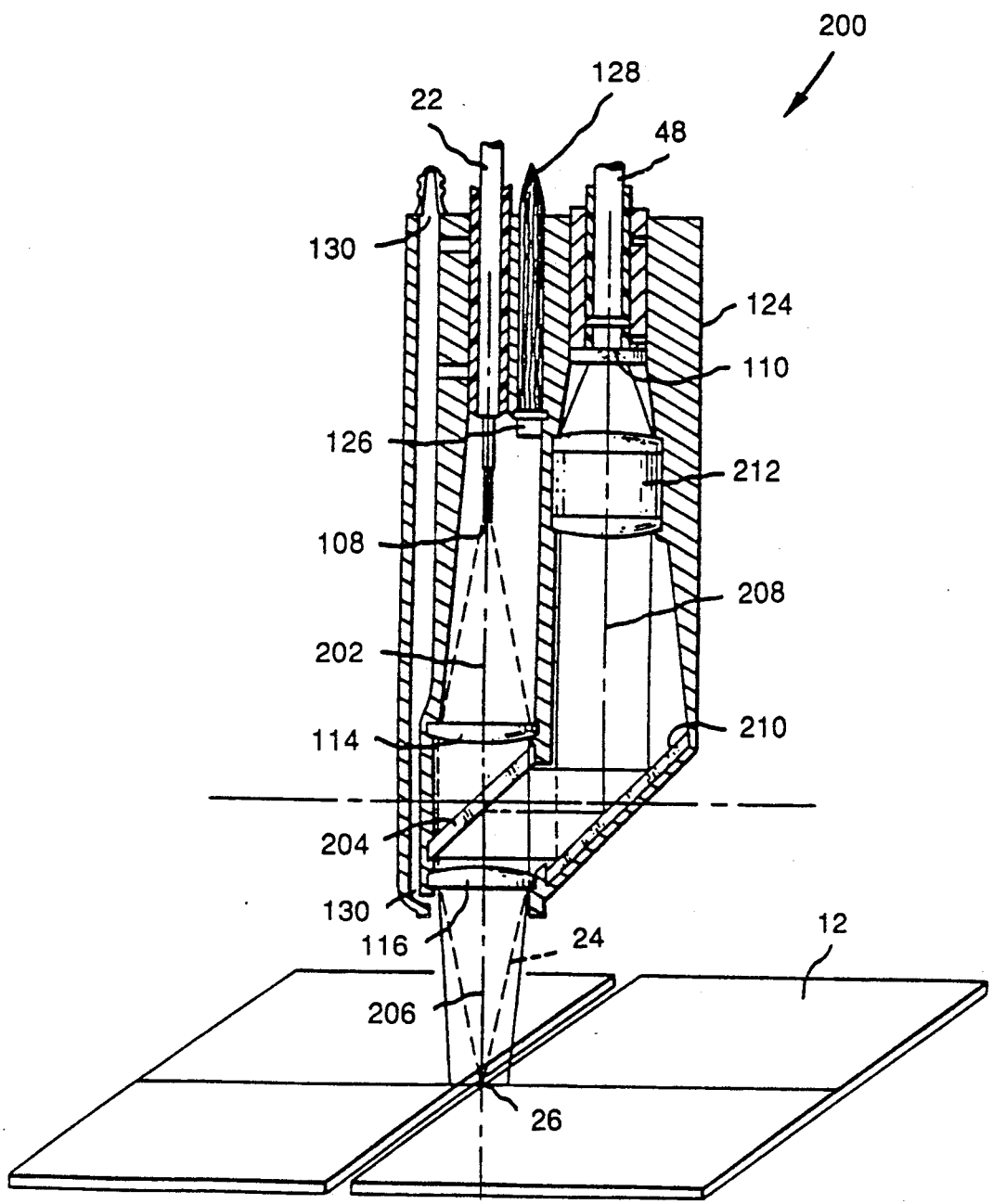
FIG. 8 is a more detailed view of the output coupler illustrated in FIG. 7.

FIG. 8 illustrates a more detailed view of output coupler 304. Specifically, fiber 302, in operation, transmits and emits a first diverging beam 316 from laser source 300. Beam 316 is intercepted by a first collimating lens 318 which emits a first collimated beam 320. Beam 320 is intercepted by a beam expanding lens 322 which emits a second diverging beam 324. Diverging beam 324 is intercepted by a second collimating lens 326. The second collimating lens emits a second collimated beam 328 which passes through, substantially undisturbed, a mirror 330. Mirror 330 is coated so as to totally transmit 1.06 micrometer signals at forty-five degrees. Such coatings are well known in the art. The second collimated beam is then intercepted by a first focusing lens 332 which focuses a beam 334 onto workpiece 314. As the focused beam interacts with workpiece 314, a plasma is generated, and an image 336 of the generated plasma is reflected to mirror 330. The reflected image of the plasma is then directed towards a second mirror 338. Mirror 338 directs the image to a second focusing lens 340 which focuses an optical image signal 342 onto optical fiber 306 for transmission to filter 308. It is contemplated that a bundle of fibers could be utilized rather than single fiber 306. Further, lens 340 could be one of many types of lenses, and may even be eliminated, so long as the optical image signal of the plasma is injected in the fiber.

Figure 9:
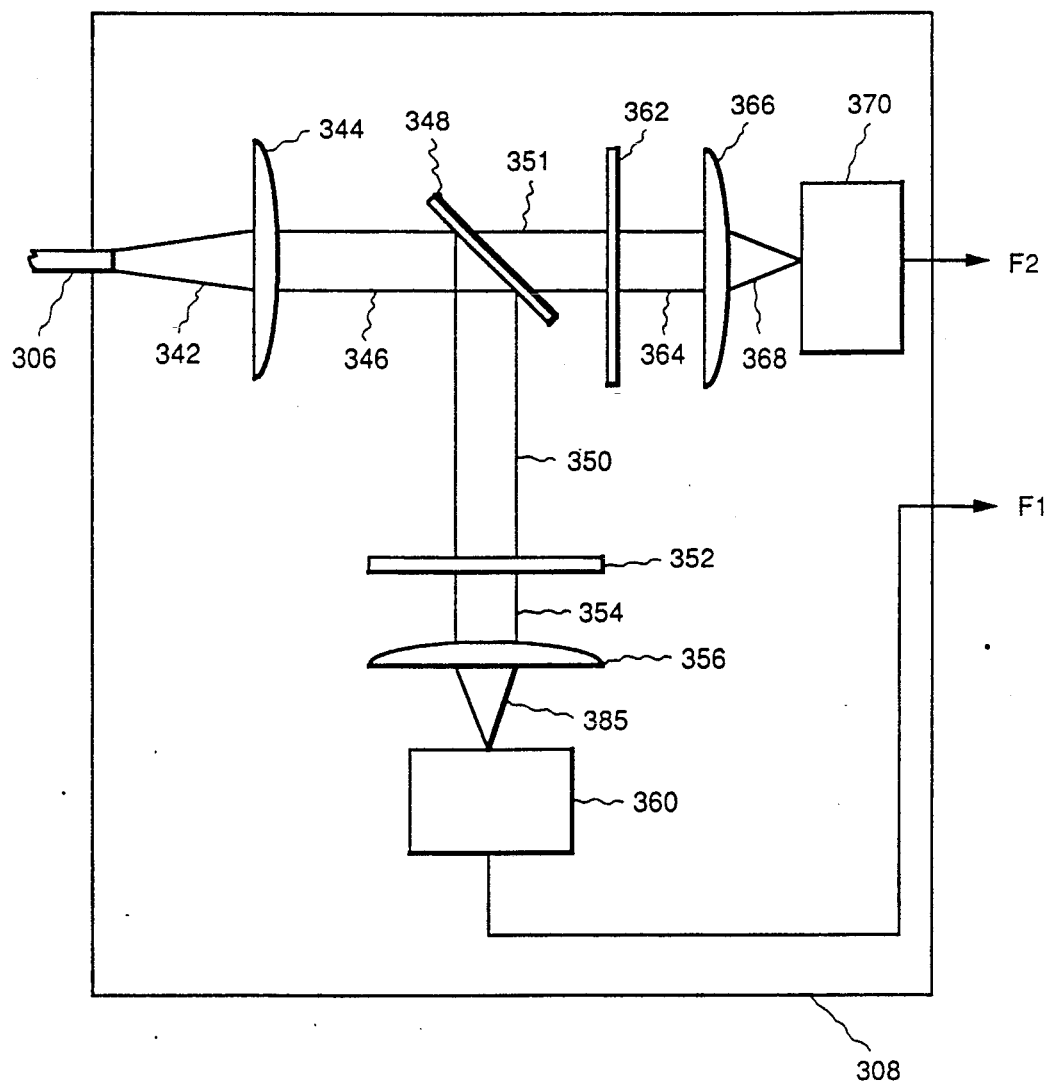
FIG. 9 is a more detailed view of the filter illustrated in FIG. 7.

FIG. 9 illustrates, in more detail, filter 308. Specifically, filter 308 receives, as input, optical image signal 342 emitted at the output end of optical fiber 306 and intercepted by a collimating lens 344. A collimated beam 346 is intercepted by a mirror 348 which splits beam 346 into a first portion 350 and a second portion 351. Mirror 348 preferably is coated so that it reflects only 1.06 micrometer wavelength when disposed at forty-five degrees. This arrangement is utilized because a portion of the processing beam may be reflected from the workpiece and back towards the output coupler. Therefore, some of the signal transmitted by fiber 306 may actually include some signal of the processing beam rather than only signals representative of the plasma formed by the beam. The signals representative of the plasma generally are wideband signals and therefore would be transmitted, substantially undisturbed, through the mirror as second portion 351. First, beam portion 350 is intercepted by a spike filter 352 which transmits only optical signals having a wavelength of 1.06 micrometers. A filtered beam 354 is transmitted to a focusing lens 356 which focuses a filtered beam 358 onto a photodetector 360. The signal provided by photodetector 360 is representative of pulse duration.

Second beam portion 351 is intercepted by a second filter 362 which only transmits signals of a wavelength, for example, less than 1.06 micrometers. Many different filtering apparatus can be utilized so long as the signals of the processing beam, i.e., 1.06 micrometer signals, are not transmitted. A filtered beam 364 is intercepted by a focusing lens 366 which focuses beam 368 onto a second photodetector 370. The signal generated from photodetector 370 is representative of the plasma generated during materials processing. Outputs F1 and F2, respectively, provided from photodetectors 360 and 370, respectively are provided to a pulse length comparator 310 for further processing. Specifically, the signals may be amplified and then converted into digital form.

In operation, and referring again to FIG. 7, a beam output from source 300 is transmitted through optical fiber 302 to output coupler 304. As explained with reference to FIG. 8, the beam is then focused onto workpiece 314. The plasma generated due to the beam impinging upon workpiece 314 creates an image signal which is transferred back through the output coupler and through optical fiber 306 to filter 308. The image signal provides information regarding the intensity of the plasma. The plasma intensity is directly related to process operations such as laser beam intensity. The data provided by the image signal therefore can be utilized to control processing.

When breakthrough occurs, optical sensor 312 also generates a signal which is transmitted to pulse length comparator 310. Photodetector 315 provides a signal representative of the total pulse length duration. From this information, breakthrough time can be determined. If breakthrough time is greater or less than expected, adjustments may be made so that more desirable processing results are achieved. For example, laser beam energy or the relative position of the output coupler to the workpiece may be adjusted.

The operation of the embodiment illustrated in FIG. 7 is similar to the embodiment illustrated in FIG. 4. Optical sensor 216 illustrated in FIG. 4, however, is replaced in the embodiment illustrated in FIG. 7 with a lens system within output coupler 304 itself. In some configurations, a lens system within output coupler 304 may be preferred because it eliminates problems associated with drilling splatter contamination and keeps the sensor free from debris.

Figure 10:
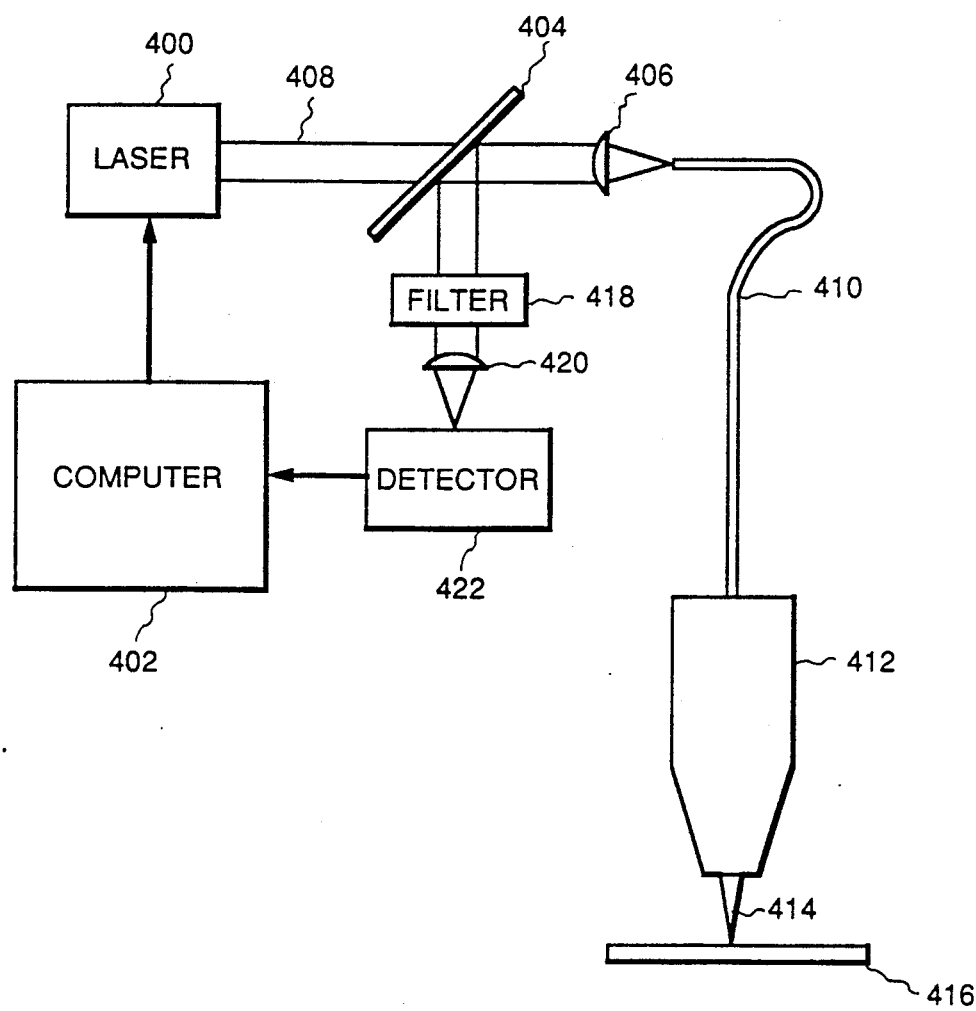
FIG. 10 illustrates a fourth embodiment of an optic-based monitoring apparatus.

A fourth embodiment of an optic based monitoring system is illustrated in FIG. 10. This embodiment includes a laser source 400 coupled to a computer 402. A mirror 404 and a focusing lens 406 are utilized for injecting a beam 408 from laser source 400 into an optical fiber 410. Mirror 404 is totally transmissive to 1.06 micrometer signals, and therefore beam 408 is transmitted, substantially undisturbed, through mirror 404. Optical fiber 410 is coupled to an output coupler 412 which emits a processing beam 414 onto a workpiece 416. Mirror 404 also is aligned with a 1.06 micrometer filter 418, a focusing lens 420 and photodetector 422.

Figure 11:
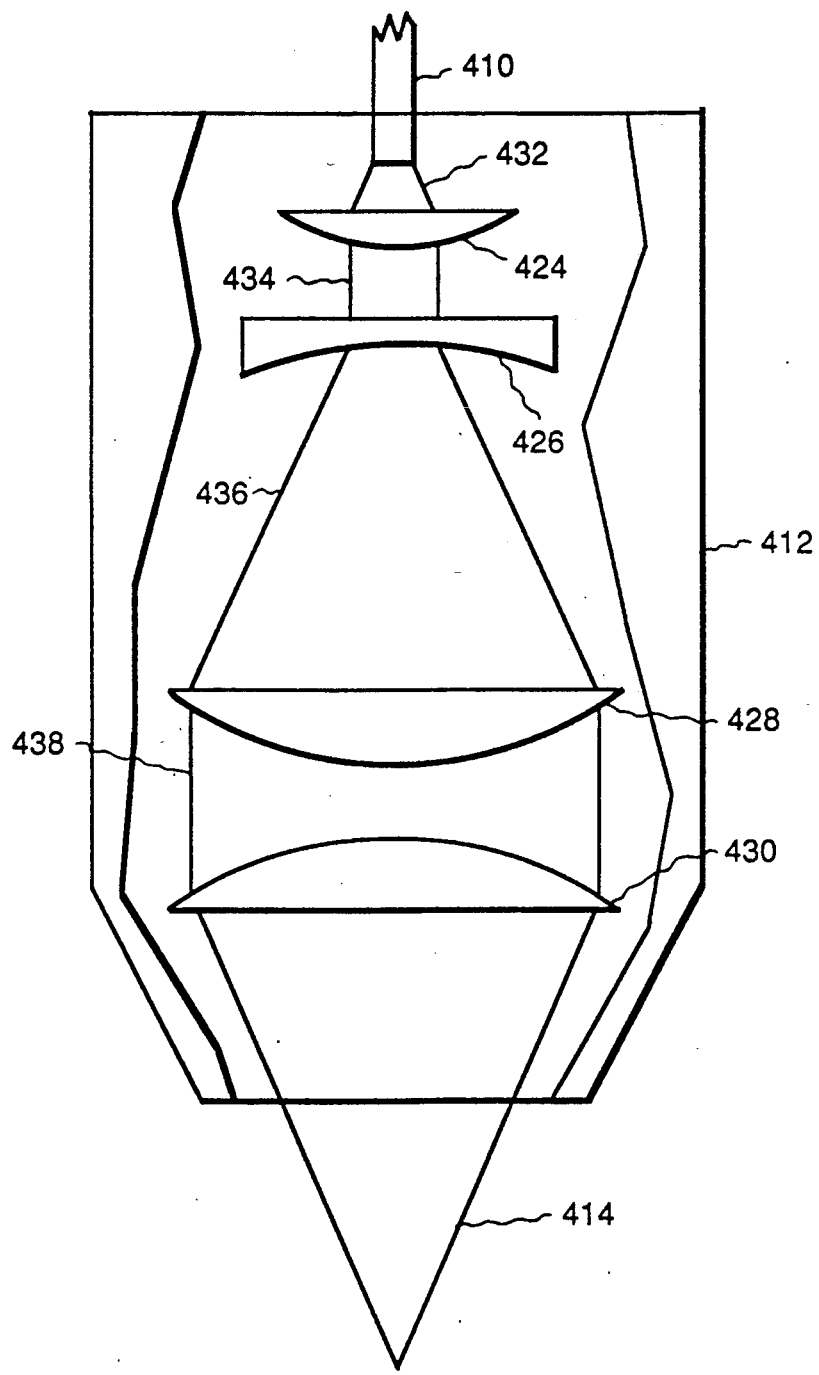
FIG. 11 is a more detailed view of an output coupler shown in FIG. 10.

As shown in FIG. 11, output coupler 412 includes a first collimating lens 424 and a beam expanding lens 426. A second collimating lens 428 is aligned with lens 426 and a focusing lens 430 is aligned with lens 428.

In operation, beam 408 emitted from source 400 is injected into fiber 410 by lens 406. The beam is transmitted by the optical fiber to output coupler 412 and emitted as a first diverging beam 432. Beam 432 is intercepted by lens 424 which forms a first collimated beam 434. The first collimated beam is intercepted by beam expanding lens 426 which forms a second diverging beam 436. Lens 428 intercepts the second diverging beam and forms a second collimated beam 438, which is intercepted by focusing lens 430. Focusing lens 430 forms a beam 414 which may be focused onto a workpiece.

During processing, and as explained above, a plasma is generated, and an image of this plasma will be transmitted back through the lens apparatus within coupler 412 and through the optical fiber. The image signal will be substantially wideband but may contain some 1.06 micrometer signals due to reflection of beam 414 off the workpiece. The image signal is emitted from the optical fiber and reflected by mirror 404 to filter 418. Filter 418 is utilized to block any 1.06 micrometer signals so that only the actual signals due to the plasma image are focused by lens 420 onto photodetector 422. The signal from detector 422 therefore is representative of the plasma formed during processing and such a signal can be utilized to control operations. Although not shown in FIG. 10, a top and bottom side sensor, as well as a sensor within laser source 400 could also be utilized as explained with reference to the other embodiments described herein.

It should be understood that the acoustic sensor shown in FIG. 1 could be utilized in combination with any of the optical sensor based embodiments described herein. Such a combination would provide more data with regard to the processing operations, and for example, some signals could be used as verification and calibration signals. The present invention is specifically directed to such combination of accoustic and optic sensor combinations.

From the foregoing discussion, it should be apparent that the present invention provides continuous monitoring of laser materials processing and operates in substantially real time. Importantly, each embodiment of the present invention does not slow laser materials processing speed and operates substantially simultaneously with the processing operations. Further, the data generated by the present apparatus can also be utilized to provide an indication of other hole geometric properties including recast layer thickness and hole taper. For example, data could be gathered during a calibration operation performed on a test coupon, and from such data which provided desirable results, comparisons during processing could be performed. If a deviation from the desired signals is detected, then adjustments could be made to the processing components. The present monitoring system also can be utilized to indicate failure of other system components such as a break in an optical fiber or laser beam/flashlamp degradation due to a sudden change in plasma intensity not due to breaking through a workpiece.

While the present invention has been described with respect to a specific embodiment, many modifications, variations, substitutions and equivalents will be apparent to workers in the art. Accordingly, it is intended that the invention be limited only by the spirit and scope of the appended claims.

What is claimed is:

1. An apparatus for monitoring laser materials processing of a workpiece, said apparatus comprising:
   means for optically monitoring the processing and generating a processing signal representative of the processing, said optical monitoring means comprising a first optical sensor disposed so as to view the workpiece on a same side that a laser beam is to be applied;
   means for acoustically monitoring the processing and generating a processing signal representative of the processing;
   means for interpreting said processing signals and generating an interpreted output; and
   means for controlling the materials processing based upon said interpreting means interpreted output and by generating a control signal applied to a laser materials processing component.

2. An apparatus for monitoring laser materials processing in accordance with claim 1 wherein said optical monitoring means comprises:
   a second optical sensor disposed so as to view the workpiece on an opposite side from a side that a laser beam is to be applied.

3. An apparatus for monitoring laser materials processing in accordance with claim 1 wherein said optical monitoring means comprises:

a third optical sensor disposed so as to generate a signal representative of a length of a laser beam pulse emitted from a laser source, the laser beam pulse being utilized to perform the materials processing.

4. An apparatus for monitoring laser materials processing in accordance with claim 1 wherein said optical monitoring means comprises a photodiode.

5. An apparatus for monitoring laser materials processing in accordance with claim 1 wherein said acoustic monitoring means comprises an accelerometer.

6. An apparatus for monitoring laser materials processing in accordance with claim 1 wherein said interpreting means comprises means for annalyzing data from said monitoring means.

7. An apparatus for monitoring laser materials processing in accordance with claim 1 wherein said control means comprises means for determining breakthrough time.

8. An apparatus for monitoring laser materials processing in accordance with claim 7 wherein said control means further comprises:
    means for controlling the focusing of a materials processing laser beam onto a focal plane; and
    means for causing relative motion between the focal plane and the workpiece.

9. A laser materials processing apparatus for performing laser materials processing on a workpiece, said processing apparatus comprising:
    means for applying a laser beam to a workpiece;
    means for optically monitoring the processing and generating a processing signal representative of the processing, said optical monitoring means comprising a first optical sensor disposed so as to view the workpiece on a same side that a laser beam is to be applied;
    means for acoustically monitoring the processing and generating a processing signal representative of the processing;
    means for interpreting the processing signal and generating an interpreted output; and
    means for controlling the materials processing based upon said interpreting means interpreted output and by generating a control signal applied to a laser materials processing component.

10. A laser materials processing apparatus in accordance with claim 9 wherein said laser beam applying means comprises;
    a power source;
    a laser beam source coupled to said power source;
    an output coupler; and
    an optical fiber coupled between said power source and said output coupler for transmitting a laser beam emitted from said power source to said output coupler.

11. An apparatus for monitoring laser materials processing in accordance with claim 9 wherein said optical monitoring means comprises:
    a second optical sensor disposed so as to view the workpiece on an opposite side from a side that a laser beam is to be applied.

12. An apparatus for monitoring laser materials processing in accordance with claim 10 wherein said optical monitoring means comprises:
    a third sensor disposed so as to generate a signal representative of a length of a laser beam pulse emitted from a laser source, the laser beam pulse being utilized to perform the materials processing.

13. An apparatus for monitoring laser materials processing in accordance with claim 9 wherein said optical monitoring means comprises a photodiode.

14. An apparatus for monitoring laser materials processing in accordance with claim 9 wherein said acoustic monitoring means comprises an accelerometer.

15. An apparatus for monitoring laser materials processing in accordance with claim 9 wherein said interpreting means comprises means for spectrally analyzing data from said monitoring means.

16. An apparatus for monitoring laser materials processing in accordance with claim 10 wherein said control means comprises means for determining breakthrough time and wherein said control means further comprises means for focusing a materials processing laser beam onto a focal plane, means for causing relative motion between the focal plane and the workpiece, and means for controlling laser pulse energy.

* * * * *